3,215,717
PHENOL SULFIDE NICKEL AMINE DERIVATIVES
Harold M. Foster, Middlesex, N.J., assignor to American Cyanamid Company, New York, N.Y., a corporation of Maine
No Drawing. Filed Dec. 11, 1961, Ser. No. 158,576
10 Claims. (Cl. 260—439)

This invention relates to and has for its object the provision of new thiobis-phenol nickel amine complexes and polyolefins stabilized therewith. More particularly it relates to nickel amine complexes of 2,2′-thiobis-4-alkyl-phenols and their use in stabilizing polyolefins against the deteriorative action of ultraviolet light.

Various classes of materials have been used in the past to stabilize polyolefins against the deteriorative action of ultraviolet light. Very recently nickel phenol-phenolates and phenolates of bis(p-alkylphenol)sulfides have been proposed for stabilizing polyethylene and polypropylene, respectively. Although these nickel derivatives do confer some degree of stability on polyolefins, and are compatible with the compositions without imparting too much color, they are not sufficiently effective to protect the formulation under prolonged ultraviolet exposure. There is a need for materials capable of stabilizing polyolefins against the deteriorative effects of prolonged exposure to ultraviolet light.

The present invention is based on the discovery of the new nickel amine complexes defined above, and their superior effectiveness in protecting polyolefins against deterioration on exposure to ultraviolet light.

The new compounds of the invention are not mixtures of amine and nickel thiobis-phenols, but discrete nickel amine complexes having amine and nickel thiobis-phenol components in a fixed ratio of 1:1. They may conveniently be prepared by heating a nickel complex of 2,2′-thiobis(p-alkylphenol) wherein the alkyl radical may be a cyclic or an open chain moiety, preferably as the 1:1 aquo complex, with the amine in an inert volatile, organic solvent, preferably a non-polar solvent such as benzene, chloroform, ether and acetone. By removal of the solvent, the substantially pure solid amine complex is obtained. The 2,2′-thiobis-p-alkylphenols are well known compounds, and may easily be prepared by known means such as reaction of a p-alkylphenol with $SCl_2$.

The 1:1 aquo complexes are prepared by reacting a nickel salt of 2,2′-thiobis-p-alkylphenol in a aqueous alcoholic medium in the presence of an acid binder such as sodium acetate.

Examples of the useful 4-alkyphenol sulfide are: bis(p-octylphenol)sulfide, bis(p-butylphenol)sulfide, bis(p-cyclohexylphenol)sulfide, bis(p-nonylphenol)sulfide, bis(p-ethylphenol)sulfide, bis(p-amylphenol)sulfide, bis(p-t-dodecylphenol)sulfide and bis(p-octadecylphenol)sulfide.

Examples of the amines which may be used to form the amine complexes are: ammonia, primary aliphatic amines such as methylamine, ethylamine, propylamine, laurylamine, butylamine, amylamine, octylamine and octadecylamine; primary aromatic amines such as aniline, anisidine, toluidine, 1-naphthylamine, 2-naphthylamine, p-dodecylaniline, p-butylaniline, xylidene and p-octyloxyaniline; and cyclic secondary amines such as morpholine, hexamethyleneimine, piperazine and piperidine.

The new nickel amine complexes may be used for stabilization of polyolefins at concentrations of from about 0.01% to 5%, preferably from about 0.2% to 1%. They show superior stabilizing characteristics in various ways such as imparting little or no color to the composition; improved compatibility so that fairly high concentrations can be used without blooming, etc.; low volatility so that the protective agent is retained without loss; high light stability so that there is minimal loss due to deterioration of the protective agent; effectiveness in preventing or minimizing development of discoloration, brittleness, loss of tensile strength, etc.

The effectiveness of the agents may be evaluated in a number of ways. Thus, the agent may be incorporated in the polyolefin composition which may then be exposed in the Fade-Ometer and observed for development of color, brittleness, etc; or the degree of deterioration on a fixed period of exposure may be determined using the number of hours exposure for induction period before development of an appreciable amount of carbonyl (by extrapolation to zero), the carbonyl formation indicating breakdown.

The invention is further illustrated by the examples which follow:

EXAMPLE 1

Nickel ammine complex of 2,2′-thiobis(p-t-octyphenol)

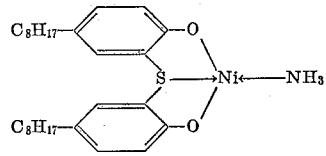

A solution of 11.5 parts of 2,2′-thiobis(4-t-octylphenol) and 7.2 parts of nickel nitrate hexahydrate in 150 parts of ethyl alcohol is heated nearly to the boil and treated, with a solution of 10 parts of 28% aqueous ammonia diluted with 25 parts ethyl alcohol. The precipitate formed is digested at the boil for a short period and then is allowed to cool. The solid is filtered off.

This cake is suspended in boiling chloroform and treated with 10 parts of 28% aqueous ammonia, whereupon the nickel complex dissolves completely in the chloroform layer. The chloroform layer is then separated and diluted with acetone. The desired product crystallizes and is collected and dried.

Calcd. for $C_{28}H_{43}NO_2SNi$: N, 2.71; S, 6.21; Ni, 11.37
Found: N, 2.59; S, 5.95; Ni, 11.02

EXAMPLE 2

A 1:1 aquo complex, i.e., wherein 1 mole of water is in combination with the nickel complex may be prepared from the thiobis-alkylphenol and nickel nitrate in aqueous alcohol using sodium acetate as an acid binder, by the following procedure:

A solution of 4 parts of 2,2′-thiobis(4-t-octylphenol) and 4 parts $Ni(NO_3)_2 \cdot 6H_2O$ in 100 parts 95% alcohol is treated with 20 parts sodium acetate dissolved in 50 parts 95% alcohol. The solid product is filtered, washed with alcohol and dried. Aquo complexes of bis(p-nonylphenol)sulfide and bis(p-amylphenol)sulfide are prepared in a similar manner. These are then used to make a variety of amine complexes.

EXAMPLE 3

Nickel dodecylamine complex

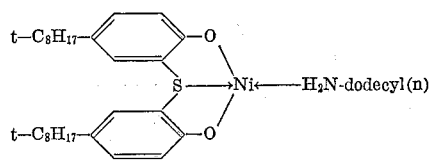

Equimolar quantities of 1:1 aquo complex of the nickel complex 2,2′-thiobis(p-t-octylphenol)sulfide of Example 2 and dodecylamine, dissolved in benzene, are evaporated to dryness. The residue is recrystallized from acetone to yield the product.

Calcd. for $C_{40}H_{67}NO_2SNi$: C, 70.16; H, 9.86; N, 2.05; S, 4.68; Ni, 8.57. Found: C, 70.59; H, 10.33; N, 2.27; S, 4.75; Ni, 8.41.

EXAMPLE 4

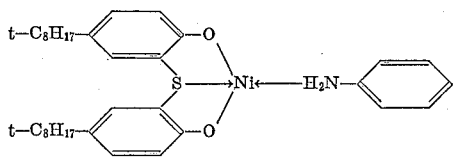

A solution of the 1:1 aquo complex employed in Example 3 and a molar excess of aniline in benzene is evaporated to dryness. The residue is dissolved in acetone and evaporated to dryness. The resulting product is dissolved in ether treated with activated alumina, clarified, evaporated to dryness and dried in vacuum for several days.

Calcd. for $C_{34}H_{47}NO_2SNi$: C, 68.92; H, 8.00; N, 2.37; S, 5.41; Ni, 9.91. Found: C, 68.22; H, 8.31; N, 2.21; S, 5.95; Ni, 10.25.

EXAMPLE 5

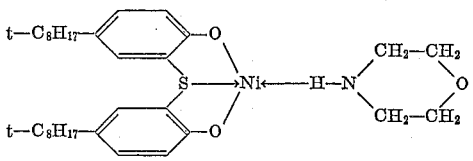

A solution of the 1:1 aquo nickel complex employed in Example 3 and a molar excess of morpholine in acetone is heated at reflux and evaporated to dryness. The product is dissolved in acetone, clarified and evaporated to dryness, and further dried in vacuum for several days.

Calcd. for $C_{32}H_{49}NO_3SNi$: C, 65.53; H, 8.42; N, 2.39; Ni, 10.01. Found: C, 65.16; H, 8.37; N, 2.48; Ni, 10.06.

EXAMPLE 6

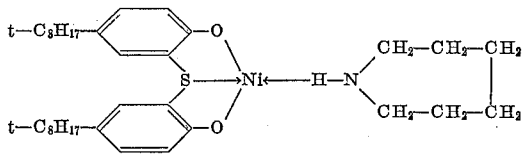

A solution of the aquo complex employed in Example 3 is dissolved in ether and this is reacted with hexamethyleneimine. The solvent is removed by evaporation, leaving the product as a residue which is dried at reduced pressure at 110° C. to remove the excess amine.

Calcd. for $C_{34}H_{53}NO_2SNi$: N, 2.34; S, 5.36; Ni, 9.81. Found: N, 2.58; S, 5.50; Ni, 9.48.

EXAMPLE 7

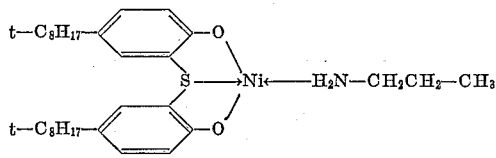

To a solution of 4 g. of 2,2′-thiobis-4-t-octylphenol in 50 ml. of chloroform is added 4 g. (excess) of n-propylamine. Then 20 ml. of aqueous 20% nickel acetate solution (excess) is added and the whole multiphase system is agitated. The chloroform is separated and dried. The chloroform is removed by evaporation leaving the product as a dry residue.

Calcd. for $C_{31}H_{49}NO_2SNi$: N, 2.49; S, 5.70; Ni, 10.43. Found: N, 2.17; S, 5.75; Ni, 10.81.

EXAMPLE 8

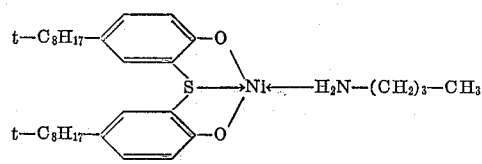

To a solution of 4 g. of 2,2′-thiobis-4-t-octylphenol in 50 ml. of chloroform is added 4.5 g. (excess) of n-butylamine. Then 20 ml. of aqueous 20% nickel acetate solution (excess) is added and the whole multiphase system is agitated. The chloroform is separated and dried. The chloroform is removed by evaporation leaving the product as a dry residue.

Calcd. for $C_{32}H_{51}NO_2SNi$: N, 2.45; S, 5.60; Ni, 10.25. Found: N, 2.57; S, 5.63; Ni, 10.37.

EXAMPLE 9

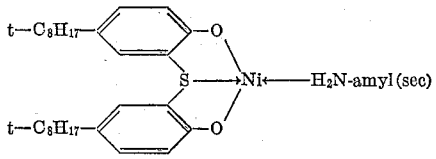

To a solution of 4 g. of 2,2′-thiobis-4-t-octylphenyl in 50 ml. of chloroform is added 5.0 g. (excess) of sec-amylamine. Then 20 ml. of aqueous 20% nickel acetate solution (excess) is added and the whole multiphase system is agitated. The chloroform is separated and dried. The chloroform is removed by evaporation leaving the product as a dry residue.

Calcd. for $C_{33}H_{53}NO_2SNi$: N, 2.39; S, 5.47; Ni, 10.01. Found: N, 2.55; S, 5.26; Ni, 9.95.

EXAMPLE 10

Effectiveness in polypropylene was determined by preparation polypropylene compositions and exposure to ultraviolet light, the time of exposure before development of brittleness (or induction period for carbonyl) being determined. The procedure is described in more detail as follows:

Fifty grams of polypropylene powder were placed in a screw top jar along with the additive to be tested. The blend was tumbled for two hours. This mixture was placed on a 6″ x 13″ mill whose rolls were heated to 360° F. and 320° F. respectively. This blend was passed through the nip of the rolls, stripped from the rolls and fed endwise into the nip to insure maximum mixing. This operation of stripping and passing through the nip was repeated 10 times. From the sheet resulting from this blend, an 18 mil sheet was compression molded. From this molded sheet, specimens were cut out for the Fade-Ometer.

In the following table is shown the degree of protection afforded the polypropylene composition by the stabilizers of this invention. This is reported as the number of hours of Fade-Ometer exposure before commencement of carbonyl formation, the carbonyl formation indicating breakdown in the composition.

| | Compound | Enc. | Fade-Ometer (hours) |
|---|---|---|---|
| 1 | Control | | 10–40 |
| 2 | Product of Example 1 | 0.5 / 0.25 | 1,500 / 850 |
| 3 | Product of Example 4 | 0.5 | 1,100 |
| 4 | Product of Example 3 | 0.5 | 900 |
| 5 | Product of Example 5 | 0.5 | 1,100 |
| 6 | Product of Example 6 | 0.25 | 550 |
| 7 | Product of Example 7 | 0.25 | 550 |
| 8 | Product of Example 8 | 0.25 | 550 |
| 9 | Product of Example 9 | 0.25 | 550 |

EXAMPLE 11

Into low density polyethylene (DYNH-3) two concentrations of the compound from Example 1 were mixed by blending on a 6" x 13" two roll mill which was maintained at 285° F. After effecting the mixing as explained in Example 10, film was exposed in the Fade-Ometer with the following results.

|  | Percent Carbonyl after "x" hours in FOM ||||
|---|---|---|---|---|
|  | 100 | 200 | 300 | 600 |
| Control | .066 | .180 | .357 | -------- |
| 0.25% amine of Example 1 | nil | nil | nil | .009 |
| 0.50% amine of Example 1 | nil | nil | nil | .009 |

I claim:
1. A nickel amine complex of 2,2'-thiobis(p-alkylphenol) wherein the complex-forming amine is a member selected from the group consisting of ammonia, primary aliphatic amines, primary aromatic amines and cyclic secondary amines, and said alkyl groups have up to eighteen carbons, said complex being characterized by a single nitrogen-to-nickel coordinate bond and a single nickel-to-sulfur coordinate bond, for each nickel atom in the complex molecule.

2. The nickel dodecylamine complex of 2,2'-thiobis-(p-t-octylphenol) of the formula:

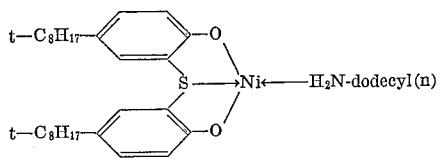

3. The nickel butylamine complex of 2,2'-thiobis(p-t-octylphenol) of the formula:

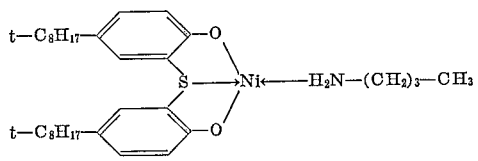

4. The nickel ammine complex of 2,2'-thiobis-(p-t-octylphenol) of the formula:

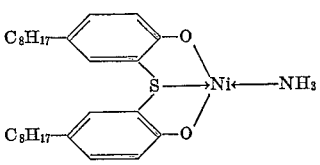

5. A process for the prepartion of a nickel amine complex of 2,2'-thiobis(p-alkylphenol) which comprises reacting a nickel complex of 2,2'-thiobis(p-alkylphenol) wherein said alkyl has from 1-20 carbons with a member selected from the group consisting of ammonia, primary aliphatic amines, primary aromatic amines and cyclic secondary amines, said reaction being carried out in an inert volatile organic solvent medium at an elevated temperature.

6. The process of claim 5 wherein a 1:1 aquo nickel complex of 2,2'-thiobis(p-alkylphenol) is employed as the starting material.

7. The process of claim 6 wherein the 1:1 aquo complex is 1:1 aquo nickel complex of 2,2'-thiobis(p-t-octylphenol).

8. The process of claim 5 wherein the member is dodecylamine.

9. The process of claim 5 wherein the member is ammonia.

10. The process of claim 5 wherein the member is butylamine.

References Cited by the Examiner
UNITED STATES PATENTS

| 2,380,299 | 7/45 | Evans et al. |  |
|---|---|---|---|
| 2,402,448 | 6/46 | Richards | 260—429 |
| 2,630,419 | 3/53 | Wakefield et al. | 260—44 |
| 2,886,591 | 5/59 | Lautenschlager | 260—486 |
| 2,971,941 | 2/61 | Fuchsman et al. | 260—45.75 |
| 2,971,968 | 2/61 | Nickolson et al. | 260—439 |
| 3,058,948 | 10/62 | Mosimann et al. | 260—44 |
| 3,060,210 | 10/62 | De Groote et al. | 260—404.5 |
| 3,098,863 | 7/63 | Dessauer et al. | 260—45.75 |
| 3,127,372 | 3/64 | Matlack | 260—45.75 |
| 3,150,160 | 9/64 | Dexter | 260—439 |

TOBIAS E. LEOW, *Primary Examiner.*

LOUISE P. QUAST, LEON J. BERCOVITZ,
*Examiners.*